United States Patent [19]
Reazer et al.

[11] Patent Number: 5,445,339
[45] Date of Patent: Aug. 29, 1995

[54] CASSETTE WINDER TOOL

[76] Inventors: Terry J. Reazer, 3300 Saxony Rd., Springfield, Ill. 62703; William J. Reazer, Jr., 55 Nottingham Dr., Chatham, Ill. 62629

[21] Appl. No.: 24,282

[22] Filed: Mar. 1, 1993

[51] Int. Cl.$^6$ ............................................. B65H 18/10
[52] U.S. Cl. ................... 242/350; 242/395; 242/546.1; 81/439
[58] Field of Search .............. 242/179, 96, 199, 200, 242/350, 395, 546.1, 564.2; 81/438, 439

[56] References Cited

U.S. PATENT DOCUMENTS

| | | | |
|---|---|---|---|
| 190,119 | 5/1877 | Budd | 81/439 |
| 814,020 | 3/1906 | Clifford | 81/439 |
| 1,197,734 | 9/1916 | Graffert et al. | 242/538 X |
| 1,965,917 | 7/1934 | Anderholm | 81/439 |
| 3,999,725 | 12/1976 | Arbib | 242/546.1 |
| 4,147,314 | 4/1979 | Tranlsen | 242/546.1 |
| 4,390,146 | 6/1983 | Jorephani | 242/546.1 |
| 4,703,903 | 11/1987 | Gilmore | 242/546.1 |
| 4,899,946 | 2/1990 | Espin et al. | 242/546.1 |
| 4,974,790 | 12/1990 | Myers | 242/546.1 |
| 4,993,658 | 2/1991 | Lantrip et al. | 242/546.1 |

FOREIGN PATENT DOCUMENTS

| | | | |
|---|---|---|---|
| 610478 | 10/1948 | United Kingdom | 81/439 |

*Primary Examiner*—John Q. Nguyen

[57] ABSTRACT

A tool formed of a generally cross-shaped configuration defined by a central plate, wherein the plate includes a top edge mounting a first leg thereon medially of the top edge, with a bottom leg mounted medially of a bottom edge of the plate, with the top and bottom legs defined by a respective first and second diameter. The first and second diameters are substantially equal to a first and second diameter defined by respective audio and video cassette construction permitting insertion of the first and second leg within respective audio and video cassettes permitting their winding to remove slack, advance film, rewind film and the like. Further, the organization is utilized in cooperation with a crank handle, the crank handle formed with a crank axle defined by a slot to receive selectively the first or second leg therewithin to enhance a winding procedure.

1 Claim, 4 Drawing Sheets

PRIOR ART

CASSETTE WINDER TOOL

BACKGROUND OF THE INVENTION

1. Field of the Invention

The field of invention relates to cassette tool structure, and more particularly pertains to a new and improved cassette winder tool wherein the same is arranged for the selective rotation of a sprocket axle of an associated cassette.

2. Description of the Prior Art

The use of audio and video cassettes in contemporary society is widespread. Frequently, positioning of a particular orientation within the length of tape within such cassette structure is required by either advancing, rewinding, or repositioning the tape within the cassette housing. Prior art has been utilized to effect such that has typically been of a construction lacking mechanical advantage or of an elaborate configuration. A prior art device utilized in this area, is set forth in U.S. Pat. No. 4,703,903 to Gilmore wherein a bullet-shaped member utilizes a plurality of tooth portions mounted at a lower end of the member relative to an upper conical portion, wherein the member is arranged for reception within sprockets of an associated cassette.

U.S. Pat. No. 4,147,314 to Traulsen sets forth a winding tool formed with a blade tapering downwardly to a conical lower end formed with teeth directed outwardly therefrom for reception within a sprocket of a cassette.

U.S. Pat. No. 3,999,725 to Arbib sets forth a cassette tool utilizing a hand operated device defined as a crank handle operative through reduction gearing positionable within a cassette sprocket for the winding of the film within the cassette.

As such, it may be appreciated that there continues to be a need for a new and improved cassette winder tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cassette tool apparatus now present in the prior art, the present invention provides a cassette winder tool wherein the same utilizes a cross-shaped assembly utilizing legs of varying diameters for reception of the tool within audio and video cassette construction and further including a crank handle mounted to either leg selectively for enhanced repetition of winding. As such, the general purpose of the prescott invention, which will be described subsequently in greater detail, is to provide a new and improved cassette winder tool which has all the advantages of the prior art cassette winding apparatus and note of the disadvantages.

To attain this, the present invention provides a tool formed of a generally cross-shaped configuration defined by a central plate, wherein the plate includes a top edge mounting a first leg thereon medially of the top edge, with a bottom leg mounted medially of a bottom edge of the plate, with the top and bottom legs defined by a respective first and second diameter. The first and second diameters are substantially equal to a first and second diameter defined by respective audio and video cassette construction permitting insertion of the first and second leg within respective audio and video cassettes permitting their winding to remove slack, advance film, rewind film and the like. Further, the organization is utilized in cooperation with a crank handle, the crank handle formed with a crank axle defined by a slot to receive selectively the first or second leg therewithin to enhance a winding procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cassette winder tool which has all the advantages of the prior art cassette winding apparatus and none of the disadvantages.

It is another object of the present invention to provide a new and improved cassette winder tool which may be easily and efficiently manufactured and marketed.

It is a further object of the present invention to provide a new and improved cassette winder tool which is of a durable and reliable construction.

An even further object of the present invention is to provide a new and improved cassette winder tool which is susceptible of a low cost of manufacture with regard to both materials and labor, and which accordingly is then susceptible of low prices of sale to the consuming public, thereby making such cassette winder tools economically available to the buying public.

Still yet another object of the present invention is to provide a new and improved cassette winder tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
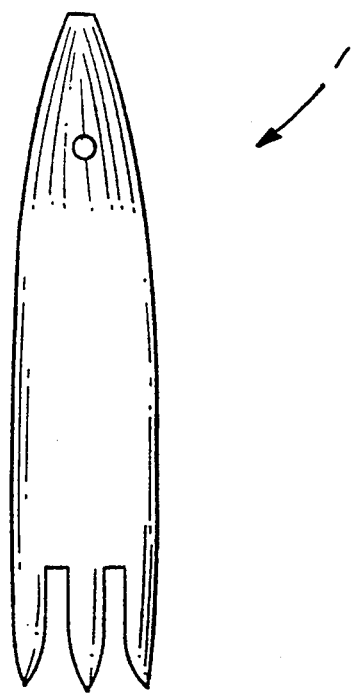
FIG. 1 is an orthographic side view of a prior art cassette winding tool.

With reference now to the drawings, and in particular to FIGS. 1 to 9 thereof, a new and improved cassette winder tool embodying the principles and concepts of the present invention and generally designated by the reference numeral 10 will be described.

FIG. 1 illustrates a prior art cassette winding tool 1, as set forth in U.S. Pat. No. 4,703,903, wherein the toothed lower end is receivable within the sprocket spool cavity 3 of an associated audio cassette 2, wherein the sprocket spool cavity 3 is defined by a predetermined first diameter within an audio cassette, whereas a video cassette 2a set forth in FIG. 6 utilizes a sprocket spool cavity 3a defined by a sprocket spool cavity of a second diameter.

Figure 2:
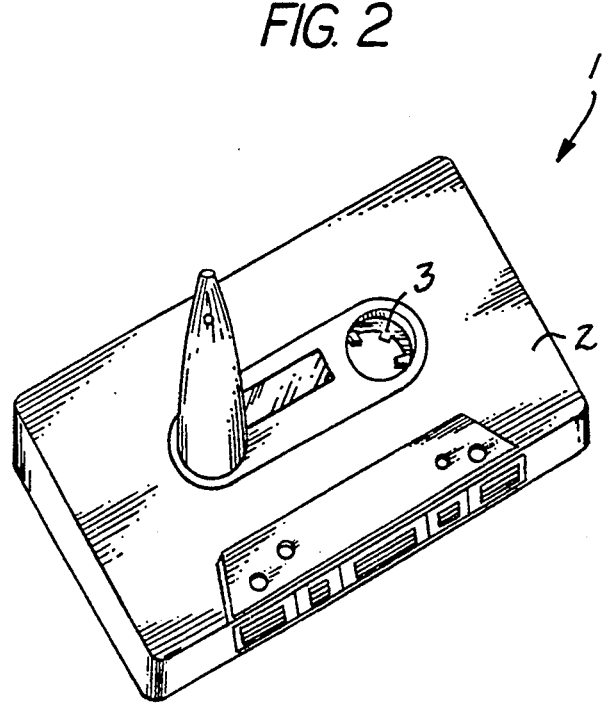
FIG. 2 is an isometric illustration of the device FIG. 1 oriented within an audio cassette.
Figure 3:
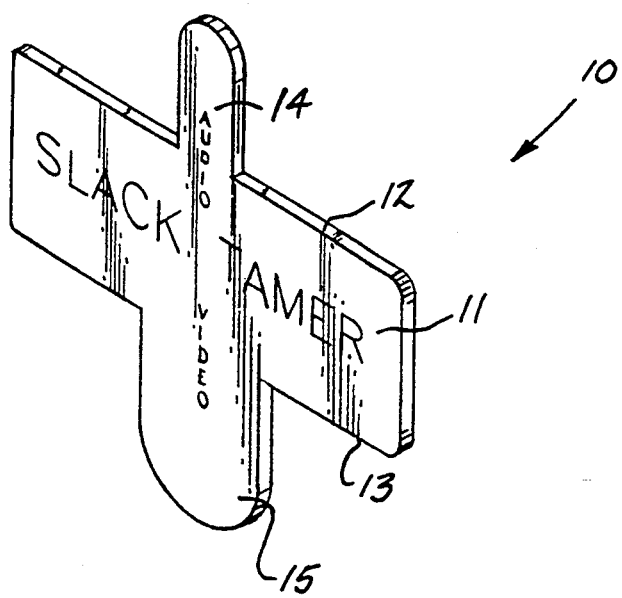
FIG. 3 is an isometric illustration of the instant invention.
Figure 4:
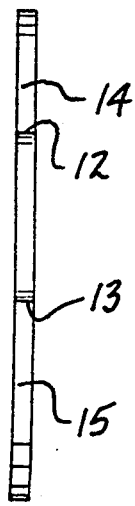
FIG. 4 is an orthographic side view of the instant invention.
Figure 5:
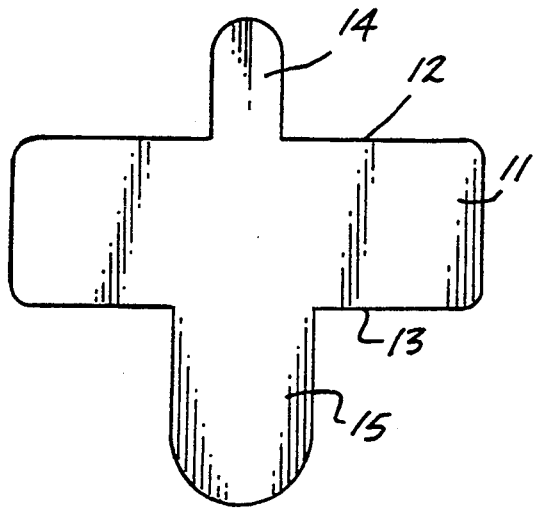
FIG. 5 is an orthographic front view, taken in elevation, of the instant invention.
Figure 6:
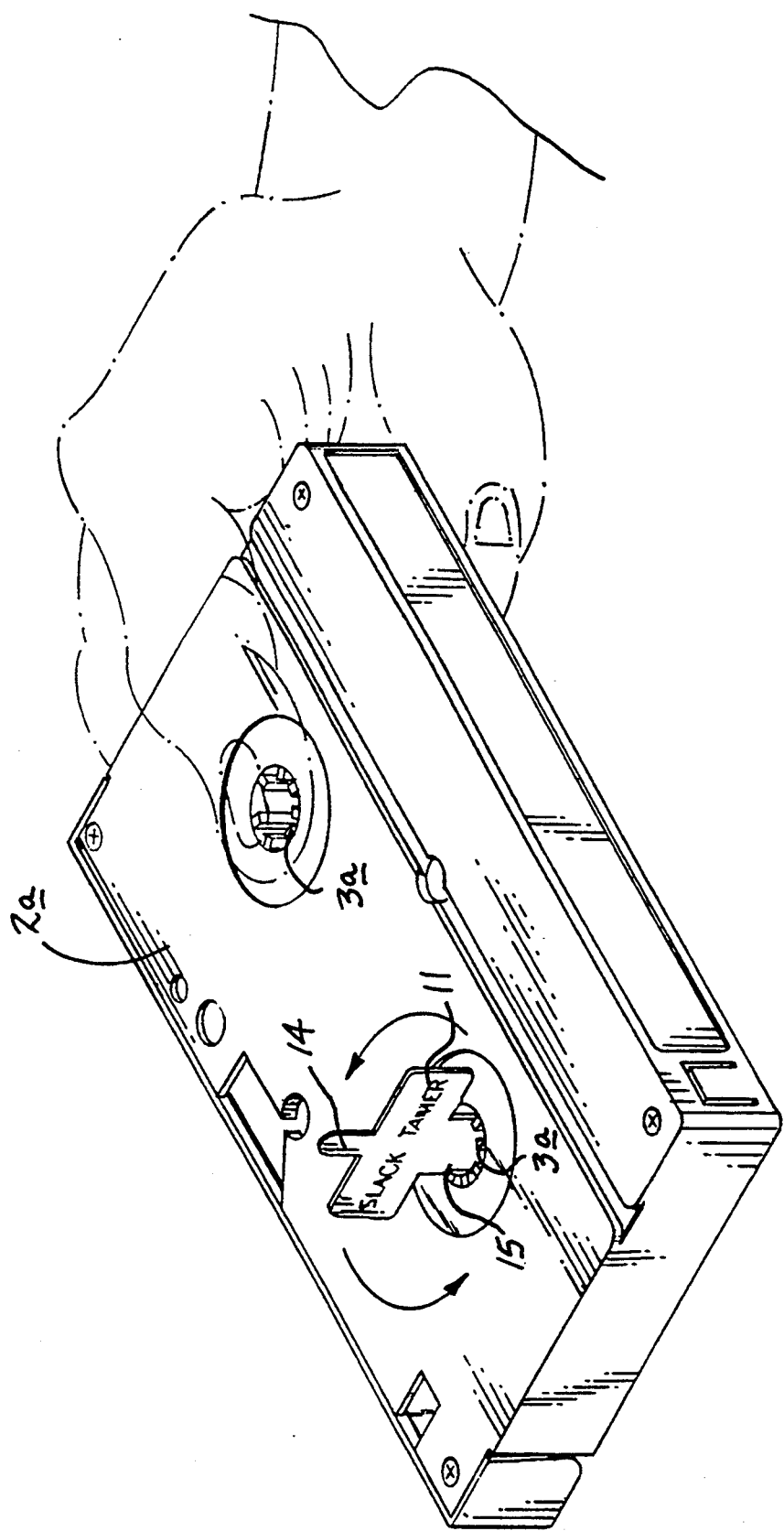
FIG. 6 is an isometric illustration of the invention mounted within a video cassette.

More specifically, the cassette winder tool 10 of the instant invention essentially comprises a central plate 11 of a planar construction, including a plate top edge 12 spaced from and parallel a bottom edge 13. Integrally mounted medially of the top edge 12 is a top leg 14 defined by a first width. The first width is equal to the predetermined first diameter of an audio cassette spool cavity, as illustrated in FIG. 2. Integrally mounted medially of the bottom edge 13 is the bottom leg 15 defined by a second width. The second width is substantially equal to the second diameter of the video cassette 2a, as illustrated in FIG. 6, to permit application of the tool to audio and video cassettes, as are contemporarily utilized. The top leg 14, the bottom leg 15, and the central plate 11 are in a single plane to define a coplanar construction for ease of storage and use in rotation of the device relative to an associated cassette. Further, the top leg 14 and the bottom leg 15 are longitudinally aligned.

Figure 7:
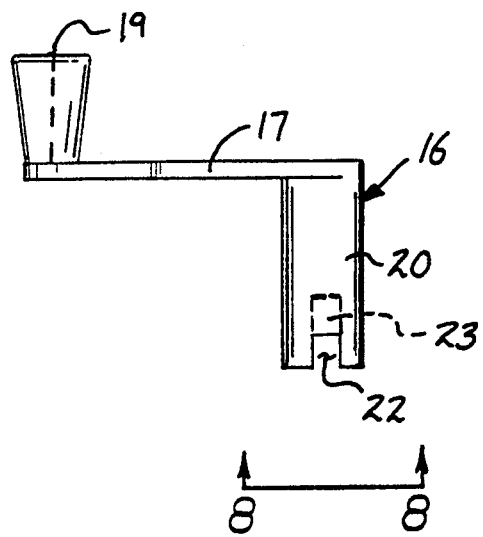
FIG. 7 is an orthographic side view of a crank handle member utilized by the instant invention.
Figure 8:
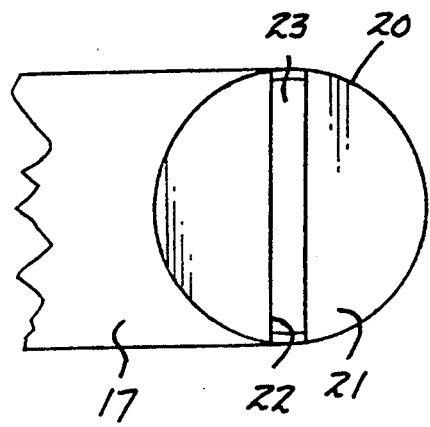
FIG. 8 is an orthographic view, taken along the lines 8—8 of FIG. 7 in the direction indicated by the arrows.
Figure 9:
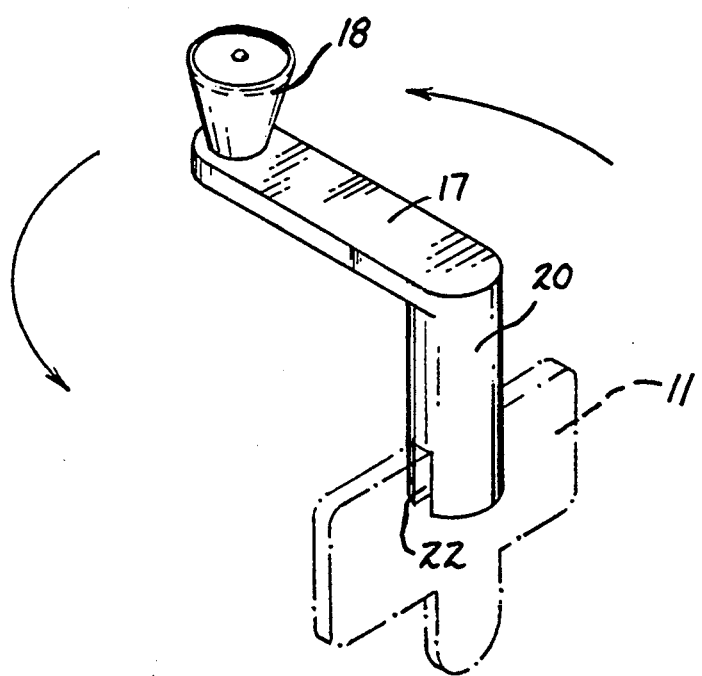
FIG. 9 is an isometric illustration of the crank handle member as set forth in FIG. 7 defining the winding tool assembly utilized by the instant invention.

FIG. 7 illustrates the use of a crank handle member 16, wherein the crank handle member 16 provides repetition of rotation of the tool when inserted within an associated cassette. The crank handle 16 includes a crank handle plate 17, including a first end and a second end, the first end orthogonally mounts a grasp knob 18 adjacent the first end, with the remote second end orthogonally mounting the crank handle 20 therefrom. The crank handle 20 extends downwardly from the plate 17, while the grasp knob 18 extends upwardly therefrom, wherein the grasp knob 18 is rotatably mounted about an axle 19. The axle 19, as well as the grasp knob 18, are arranged parallel to and spaced from the crank axle 20. The crank axle 20 includes a bottom wall 21 that is orthogonal relative to a crank axle axis of the crank axle 20, with the bottom wall including a crank slot 22 diametrically directed through the crank axle bottom wall and crank axle 20. A slot recess 23 is orthogonally oriented relative to the slot 22 diametrically directed through the crank axle 20 in communication with the slot 22 to permit selective reception of the top leg 14 or the bottom leg 15 therewithin, whereupon the slot 22 receives selectively either the top or the bottom leg 15 therewithin.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cassette winder tool, comprising,
a central plate, the central plate including a top edge spaced from and parallel to a bottom edge, a top leg integrally and medially mounted to the top edge, and a bottom leg integrally and medially mounted to the bottom edge, the top leg having a first width, and the bottom leg having a second width, wherein the second width is greater than the first width, and
the central plate, the top leg, and the bottom leg are coplanar, and
a crank handle, the crank handle including a handle plate, the handle plate including a first end spaced from a second end, and a grasp knob orthogonally and rotatably mounted to a top surface of the handle plate about a knob axle, wherein the knob axle is orthogonally and fixedly mounted to the handle plate adjacent the first end, and a crank axle fixedly mounted to a bottom surface of the handle plate adjacent the second end, wherein the crank axle and the knob axle are parallel, and the crank axle including a crank axle axis, and the crank axle including a bottom wall orthogonally oriented relative to the crank axle axis and parallel to the handle plate, and the bottom wall including a slot directed through the crank axle and the bottom wall, and the slot including a slot recess contained within the crank axle and orthogonally oriented relative to the slot, wherein the slot recess selectively receives the top leg or the bottom leg therewithin to permit rotation of the central plate when the top leg and bottom leg are selectively received within the slot and slot recess.

* * * * *